United States Patent
Fukui et al.

(10) Patent No.: US 10,408,352 B2
(45) Date of Patent: Sep. 10, 2019

(54) FLOW CONTROL VALVE

(71) Applicant: AISAN KOGYO KABUSHIKI KAISHA, Obu-shi, Aichi-ken (JP)

(72) Inventors: Makoto Fukui, Nagoya (JP); Mamoru Yoshioka, Nagoya (JP); Naruto Ito, Nissin (JP); Takashige Inagaki, Obu (JP); Kasumi Mishima, Toyoake (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 0 days.

(21) Appl. No.: 15/779,914

(22) PCT Filed: Dec. 22, 2016

(86) PCT No.: PCT/JP2016/088345
§ 371 (c)(1),
(2) Date: May 30, 2018

(87) PCT Pub. No.: WO2017/134956
PCT Pub. Date: Aug. 10, 2017

(65) Prior Publication Data
US 2018/0320790 A1 Nov. 8, 2018

(30) Foreign Application Priority Data
Feb. 4, 2016 (JP) ................................. 2016-019697

(51) Int. Cl.
*F16K 1/22* (2006.01)
*F16K 1/24* (2006.01)
(Continued)

(52) U.S. Cl.
CPC ................ *F16K 1/221* (2013.01); *F16K 1/20* (2013.01); *F16K 1/24* (2013.01); *F16K 31/041* (2013.01);
(Continued)

(58) Field of Classification Search
CPC ...... F16K 1/221; F16K 31/041; F16K 31/535; F16K 1/20; F16K 1/24; H01M 8/04201; H01M 2250/20
(Continued)

(56) References Cited

U.S. PATENT DOCUMENTS 2,673,061 A * 3/1954 Broz ......................... F16K 1/24
251/163
4,770,392 A * 9/1988 Schmidt .................. F16K 1/221
251/158
(Continued)

FOREIGN PATENT DOCUMENTS

JP   S49-053321 U   5/1974
JP   S50-023733 U   3/1975
(Continued)

OTHER PUBLICATIONS

Aug. 7, 2018 International Preliminary Report on Patentability issued in International Patent Application No. PCT/JP2016/088345.
(Continued)

*Primary Examiner* — John Bastianelli
(74) *Attorney, Agent, or Firm* — Oliff PLC

(57) ABSTRACT

A flow control valve comprising a valve seat provided with a valve hole and a seat surface, a valve element formed with a sealing surface corresponding to the seat surface, and a rotary shaft to which the valve element is integrally provided, the central axis of the rotary shaft being arranged eccentrically toward the radial direction of the valve hole from the central axis of the valve hole, and the sealing surface being arranged eccentrically toward the direction in which the central axis of the valve element extends from the central axis of the rotary shaft. The flow control valve has a valve element movement direction restriction member for stopping rotation of the valve element, and thereafter moving the valve element toward the valve seat while also relatively rotating the valve element about the eccentric axis eccentric from the central axis of the rotary shaft, relative to the rotary shaft.

6 Claims, 15 Drawing Sheets

(51) Int. Cl.
  *F16K 31/53*  (2006.01)
  *F16K 1/20*  (2006.01)
  *F16K 31/04*  (2006.01)
  *H01M 8/04082*  (2016.01)
(52) U.S. Cl.
  CPC ....... *F16K 31/535* (2013.01); *H01M 8/04201* (2013.01); *H01M 2250/20* (2013.01)
(58) Field of Classification Search
  USPC .......................................... 251/162–163, 227
  See application file for complete search history.

(56) References Cited

U.S. PATENT DOCUMENTS

| | | | | |
|---|---|---|---|---|
| 4,817,916 | A | * | 4/1989 | Rawstron .................. F16K 1/24 |
| | | | | 251/162 |
| 5,330,157 | A | * | 7/1994 | Dern ......................... F16K 1/24 |
| | | | | 251/162 |
| 2013/0068981 | A1 | * | 3/2013 | Hotta ........................ F16K 1/24 |
| | | | | 251/305 |
| 2016/0290513 | A1 | | 10/2016 | Asanuma et al. |

FOREIGN PATENT DOCUMENTS

| JP | H04-003162 Y2 | 1/1992 |
|---|---|---|
| JP | H10-238637 A | 9/1998 |
| JP | 3201573 U | 12/2015 |
| WO | 2015/098954 A1 | 7/2015 |

OTHER PUBLICATIONS

Mar. 7, 2017 International Search Report issued in International Patent Application No. PCT/JP2016/088345.

* cited by examiner

FLOW CONTROL VALVE

CROSS-REFERENCE TO RELATED APPLICATIONS

This is a US national phase application based on the PCT International Patent Application No. PCT/JP2016/088345 filed on Dec. 22, 2016, and claiming the priority of Japanese Patent Application No. 2016-019697, filed on Feb. 4, 2016, the entire contents of which are herewith incorporated by reference.

TECHNICAL FIELD

The present invention relates to a flow control valve in which a valve element is placed with a rotation center (a rotary shaft) positioned eccentrically from a center of a valve hole and a sealing surface of the valve element is positioned eccentrically from the rotary shaft.

BACKGROUND ART

Patent Document 1 discloses a butterfly valve configured such that rotation of a rotary shaft brings rotation of an eccentric cam by 180 degrees, so that a valve shaft is pressed by coil spring to press a valve plate against a valve seat while the valve is being closed from a fully open position.

RELATED ART DOCUMENTS

Patent Documents

Patent Document 1: Japanese Utility Model Application Publication No. S50(1975)-23733A

SUMMARY OF INVENTION

Problems to be Solved by the Invention

However, in the butterfly valve disclosed in the Patent Document 1, the valve plate is rotated and pressed against the valve seat, and this rotation of the valve plate on the valve seat and its vicinity could cause abrasion between the valve seat and the valve plate.

The present invention has been made in view of the circumstances to solve the above problem and has a purpose to provide a flow control valve which can restrain occurrence of abrasion between the valve seat and the valve element which is caused by rotation of the valve element on the valve seat and its vicinity.

Means of Solving the Problems

To achieve the above purpose, one aspect of the invention provides a flow control valve comprising: a valve seat including a valve hole and a seat surface formed at an edge of the valve hole; a valve element formed with a sealing surface on an outer periphery corresponding to the seat surface; and a rotary shaft integrally provided with the valve element, the rotary shaft having a central axis being positioned eccentrically from a central axis of the valve hole in a radial direction of the valve hole, and the sealing surface being positioned eccentrically from the central axis of the rotary shaft toward an extending direction of a central axis of the valve element, wherein the flow control valve further comprises a valve-element moving direction restriction member configured to halt rotation of the valve element integrally rotatable with the rotary shaft about the central axis of the rotary shaft and thereafter relatively rotate the valve element about an eccentric axis positioned eccentrically from the central axis of the rotary shaft with respect to the rotary shaft rotatable about the central axis of the rotary shaft so that the valve element moves to the valve seat.

According to the above aspect, while a valve open state is shifted to a fully-closed state, the valve element can move to the valve seat after the valve element stops rotating. This achieves restraint of abrasion between the valve seat and the valve element caused by rotation of the valve element on the valve seat and its vicinity. Further, the valve element is firmly pressed against the valve seat, thus improving sealing performance between the valve seat and the valve element. Accordingly, a flow passage is securely sealed in the fully-closed state.

In the above aspect, preferably, the flow control valve comprises: a stopper for defining a range of relative rotation of the valve element configured to rotate about the eccentric axis with respect to the rotary shaft; and a spring provided between the rotary shaft and the valve element to urge the valve element toward the stopper, wherein the valve-element moving direction restriction member constitutes a part of the valve seat and includes a lip portion configured to be pressed and bent by the valve element when the valve element moves to the valve seat, and a resilient force generated in the lip portion when the lip portion is bent is larger than an urging force of the spring urging the valve element toward the stopper.

According to the above aspect, the valve element can move to the valve seat with maintaining its posture. Thus, sealing performance between the valve seat and the valve element is improved.

In the above aspect, preferably, at a rotation halt time when the valve-element moving direction restriction member stops rotation of the valve element, the eccentric axis is positioned in a first position which is a side opposite to the valve seat with respect to a horizontal line extending through the central axis of the rotary shaft and parallel to a radial direction of the valve element, and at a stopper contact time after the rotation halt time when the valve-element moving direction restriction member brings the valve element to the vale seat to make the valve element come to contact with the stopper, the eccentric axis is positioned in a second position on a side close to the valve seat with respect to the horizontal line.

According to the above aspect, the valve element can be further securely pressed against the valve seat, thus further improving the sealing performance between the valve seat and the valve element.

In the above aspect, preferably, the flow control valve includes a bearing to support the rotary shaft, and the rotary shaft has an allowable moving amount of relatively moving in the radial direction of the rotary shaft with respect to the bearing, the allowable moving amount being larger than a moving amount of the rotary shaft moving in the radial direction of the rotary shaft when the eccentric axis moves between the first position and the second position.

According to the above aspect, the rotary shaft can move in the radial direction of the rotary shaft without any restriction by the bearing. Therefore, movement of the rotary shaft restrains movement of the valve element, thus preventing sliding of the valve element with the valve seat.

In the above aspect, preferably, the stopper is a protrusion integrally formed with the rotary shaft.

According to the above aspect, the number of components decreases and cost reduction is achieved.

In the above aspect, preferably, the valve-element moving direction restriction member is a protruding part protruding toward the valve element from a side of the valve seat, and the protruding part includes a guide portion configured to be in contact with a distal end in a rotation direction of the valve element when the valve element having integrally rotated with the rotary shaft about the central axis of the rotary shaft stops rotating and configured to guide the valve element in its movement to the valve seat while the valve element relatively rotates about the eccentric axis with respect to the rotary shaft and moves to the valve seat.

According to the above aspect, the guide portion guides movement of the valve element, thus restraining abrasion between the valve seat and the valve element caused by rotation of the valve element on the valve seat and its vicinity.

Effects of the Invention

A flow control valve of the present invention can achieve restraint of abrasion between a valve seat and a valve element caused by rotation of the valve element on the valve seat and its vicinity.

MODE FOR CARRYING OUT THE INVENTION

A detailed description of a preferred embodiment of a flow control valve 1 is explained. As it will be described later, the flow control valve 1 is adopted as an integration valve 181 (see FIG. 14) in an air system 113 of a fuel cell system 101, for example.

Figure 1:
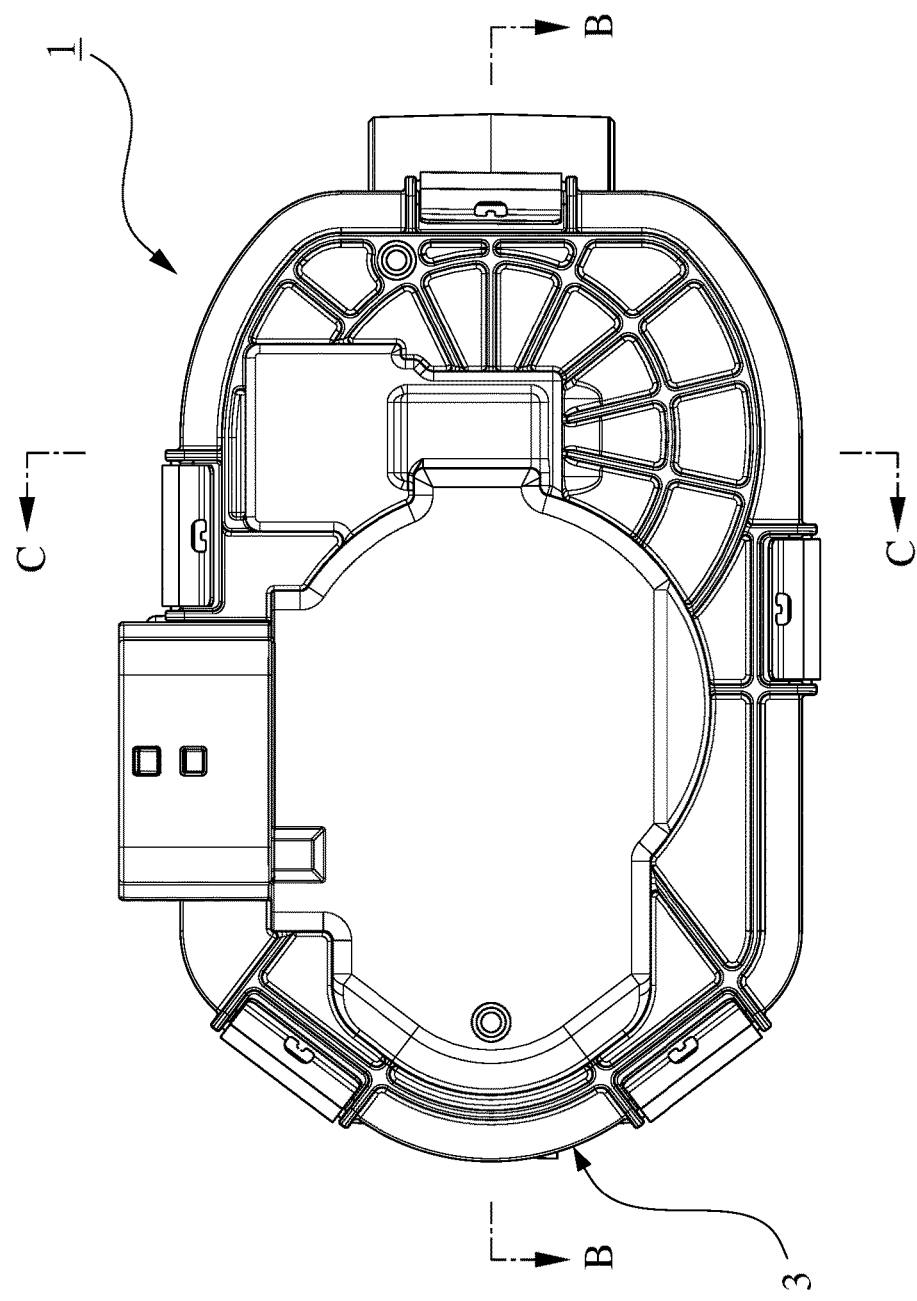
FIG. 1 is a front view of a flow control valve in the present embodiment.
Figure 2:
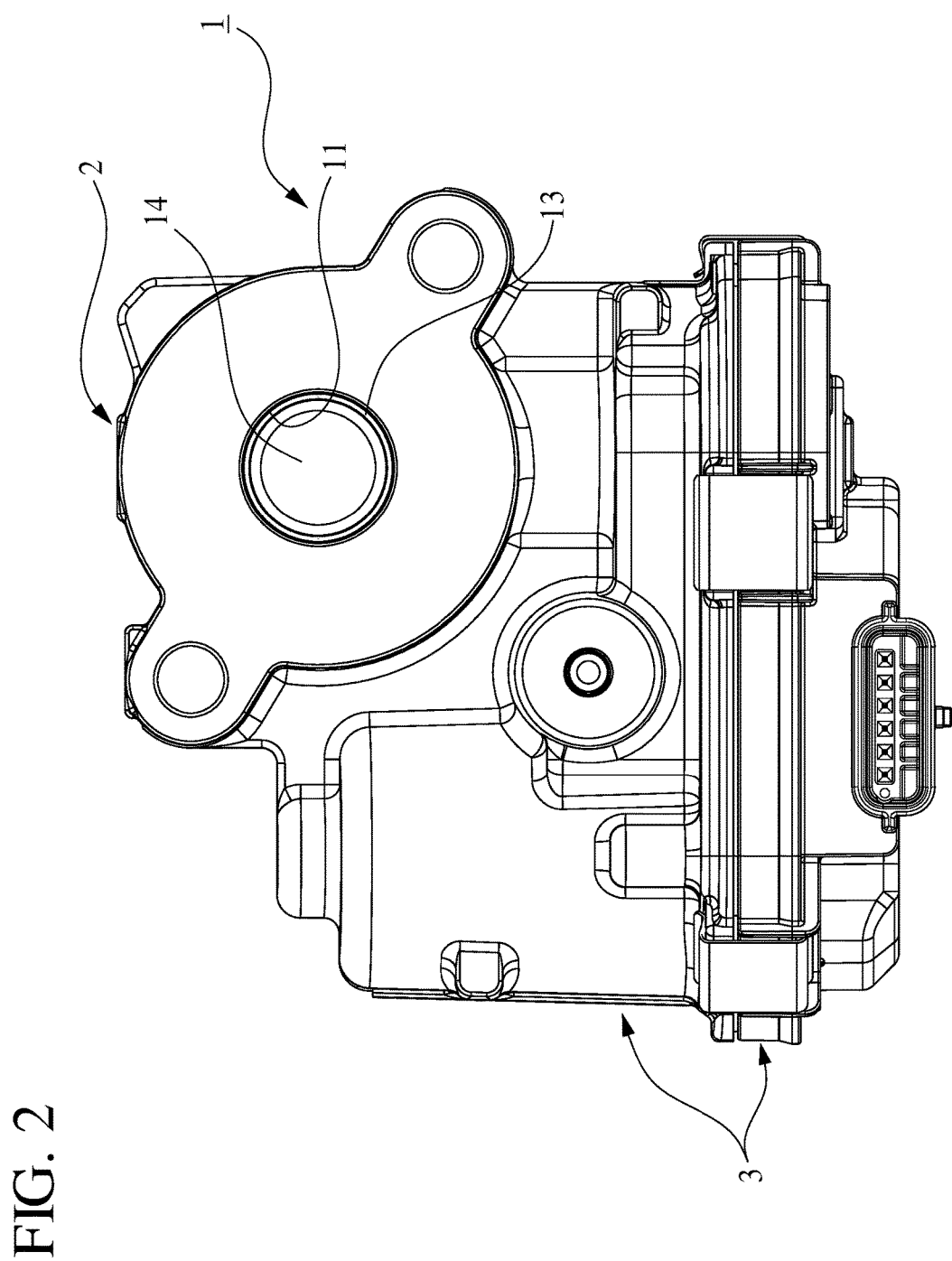
FIG. 2 is a top view of the flow control valve in the present embodiment.

As shown in FIGS. 1 and 2, the flow control valve 1 includes a valve unit 2 and a drive mechanism unit 3. The drive unit 2 includes a pipe part 12 (see FIG. 7) formed with a flow passage 11 allowing a fluid to flow therethrough. In this flow passage 11, a valve seat 13, a valve element 14, and a rotary shaft 15 (see FIG. 3 and others) are arranged. The drive mechanism unit 3 is provided with a motor 32 and a speed reducing mechanism 33 (see FIG. 7). The drive mechanism unit 3 transmits a drive force from the motor 32 to the rotary shaft 15.

Figure 3:
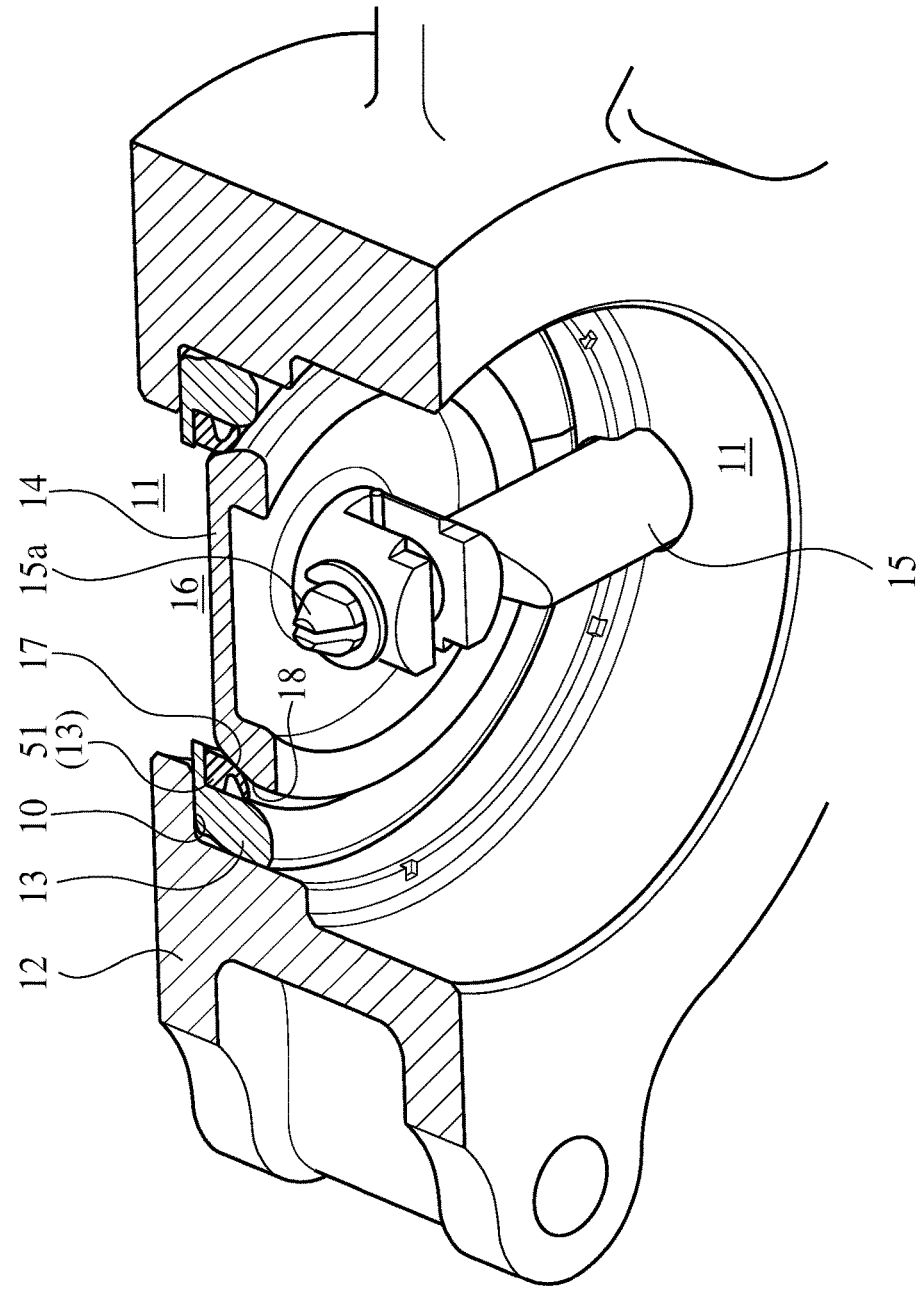
FIG. 3 is a partially-cutaway perspective view of a valve unit in a fully-closed state.
Figure 4:
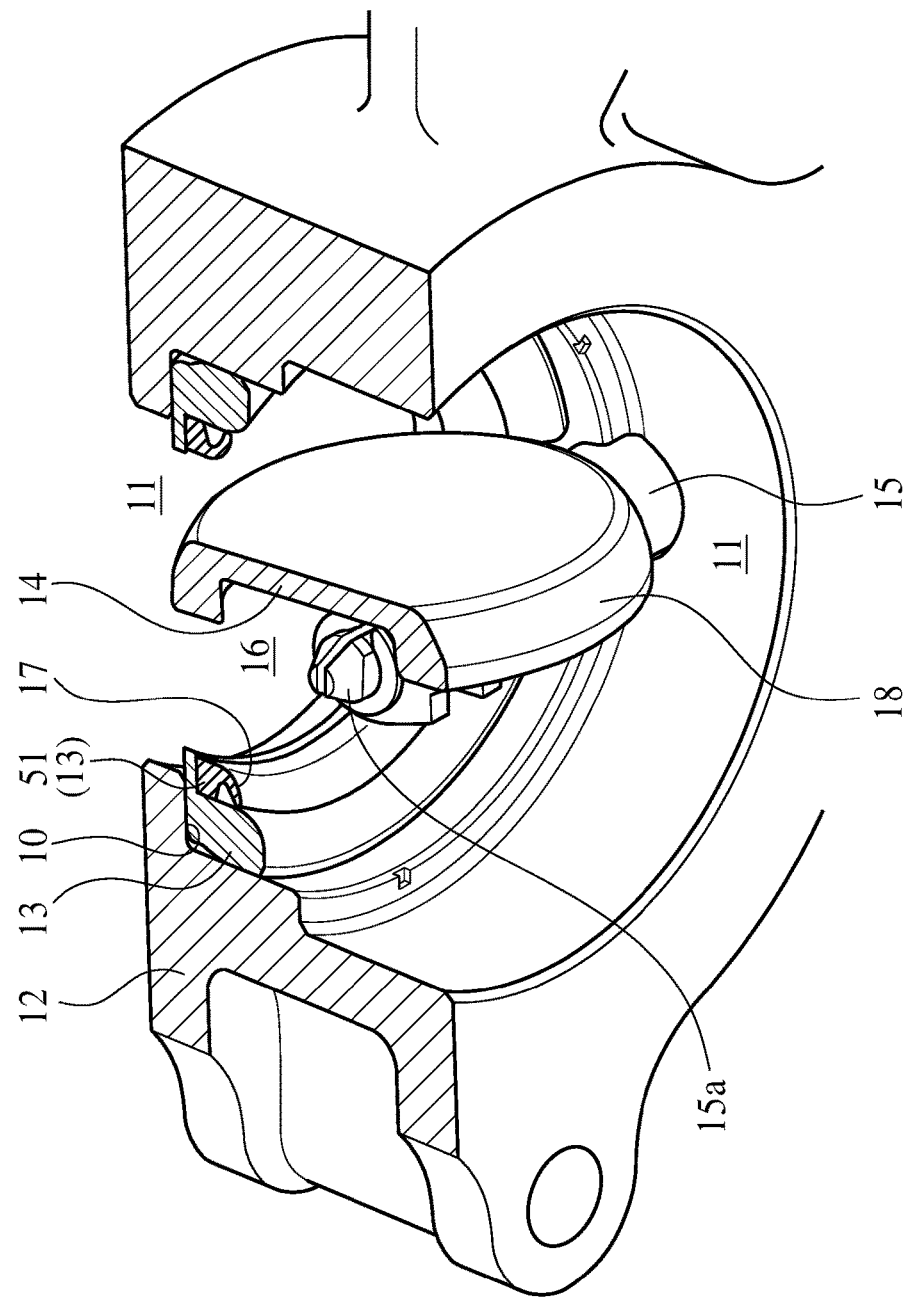
FIG. 4 is a partially-cutaway perspective view of the valve unit in an open state.

As shown in FIGS. 3 and 4, the flow passage 11 is formed with a stepped portion 10 in which the valve seat 13 is fixed by press fit. The valve seat 13 has an annular shape with a valve hole 16 in the center. On an edge of the valve hole 16, an annular seat surface 17 is formed. The valve element 14 has a circular disc shape with an annular sealing surface 18 on an outer periphery of the valve element 14, the sealing surface 18 corresponding to the seat surface 17. The valve element 14 is fixed to the rotary shaft 15 and movable integrally with the rotary shaft 15.

Figure 5:
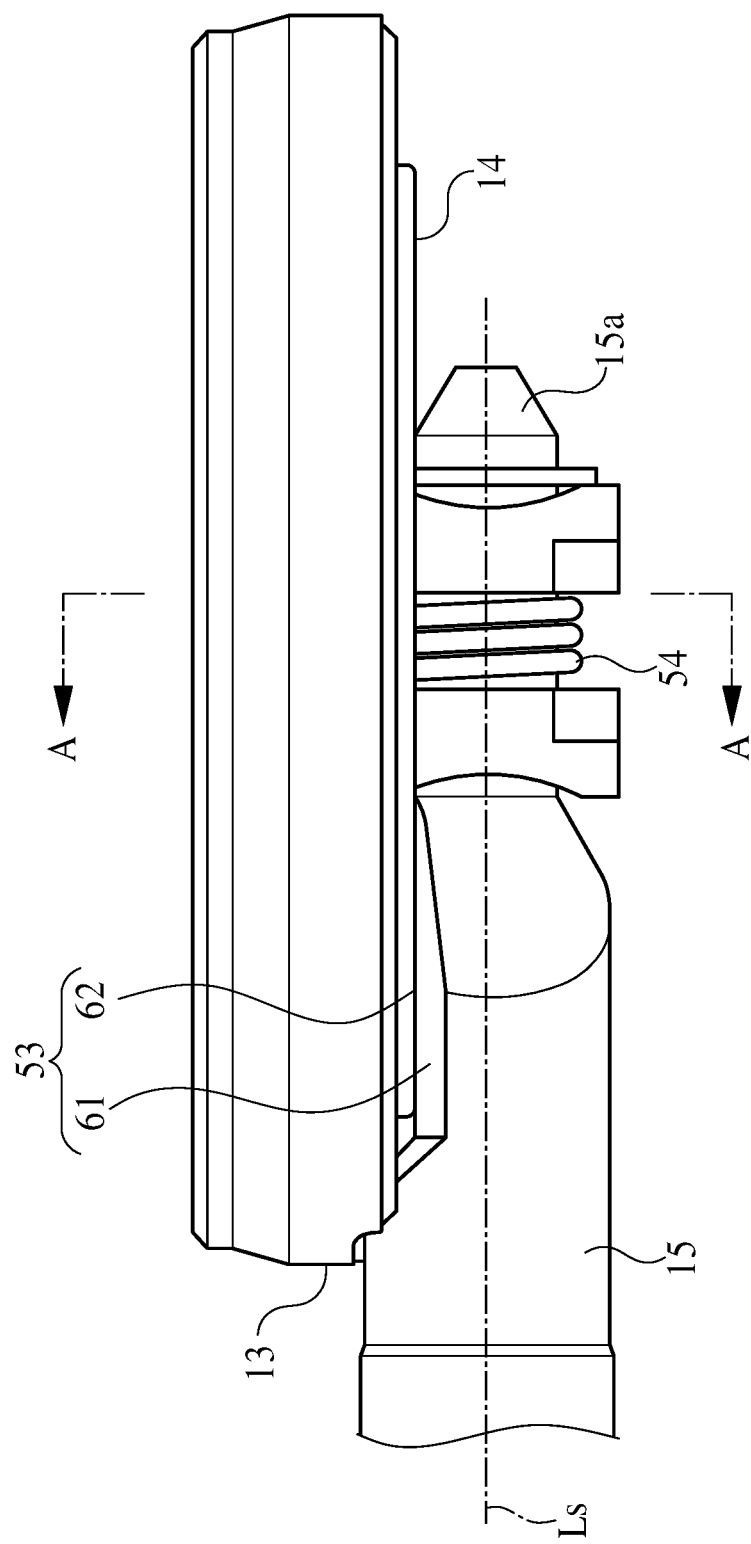
FIG. 5 is a side view of a valve seat, a valve element, and a rotary shaft in the fully-closed state.
Figure 6:
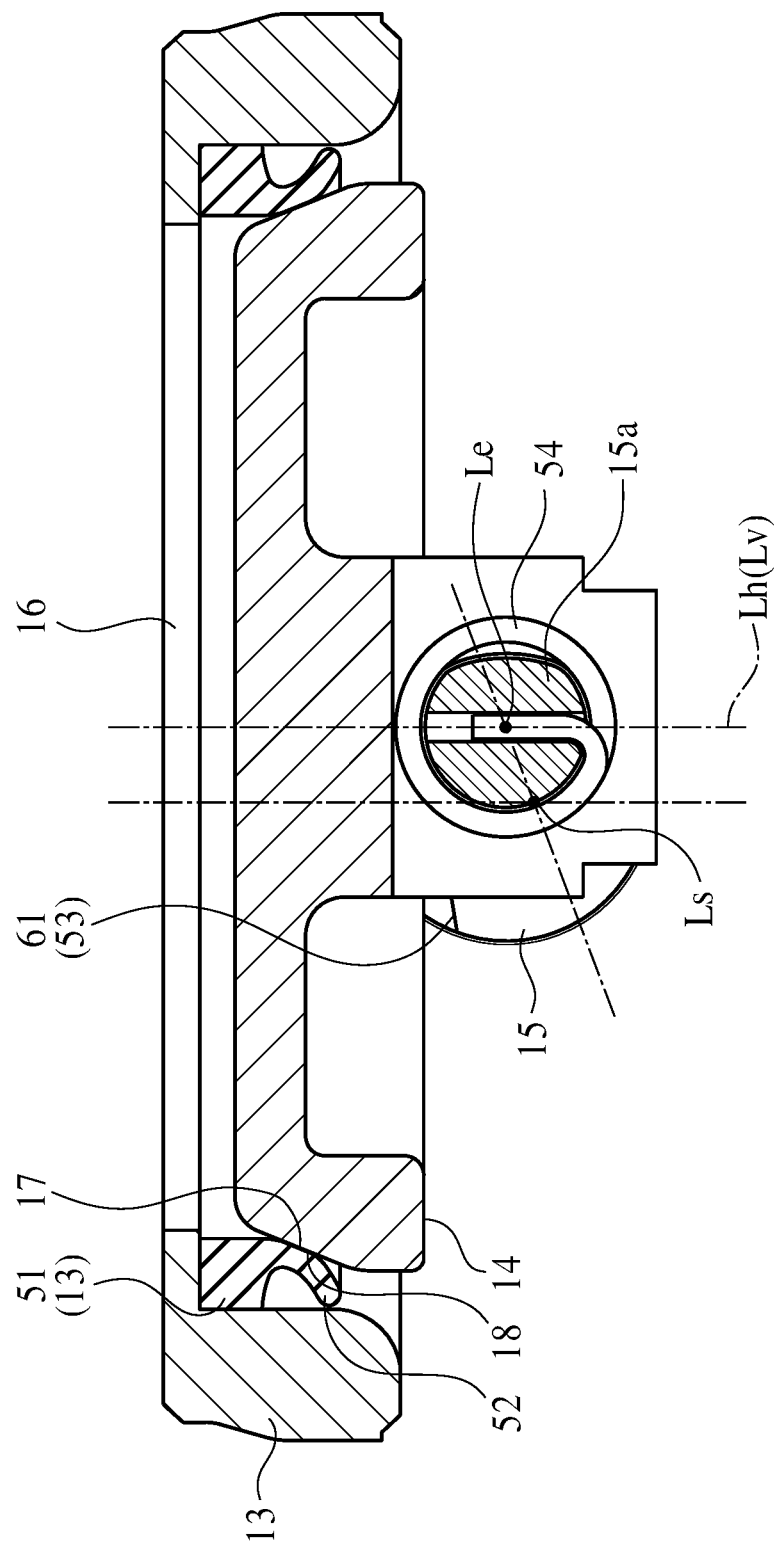
FIG. 6 is a cross-sectional view taken along a line A-A in FIG. 5.

As shown in FIGS. 5 and 6, a shaft axis Ls as a central axis of the rotary shaft 15 extends in parallel to a diameter direction of the valve element 14 (specifically, in a diameter direction of a circular-disc-shape part of the valve element 14) and is placed eccentrically, or offset, from a central axis Lh of the valve hole 16 in a radial direction of the valve hole 16. The sealing surface 18 of the valve element 14 is placed eccentrically toward an extending direction of the central axis Lv of the valve element 14 from the shaft axis Ls. The flow control valve 1 is thus constituted by a double eccentric valve.

Figure 7:
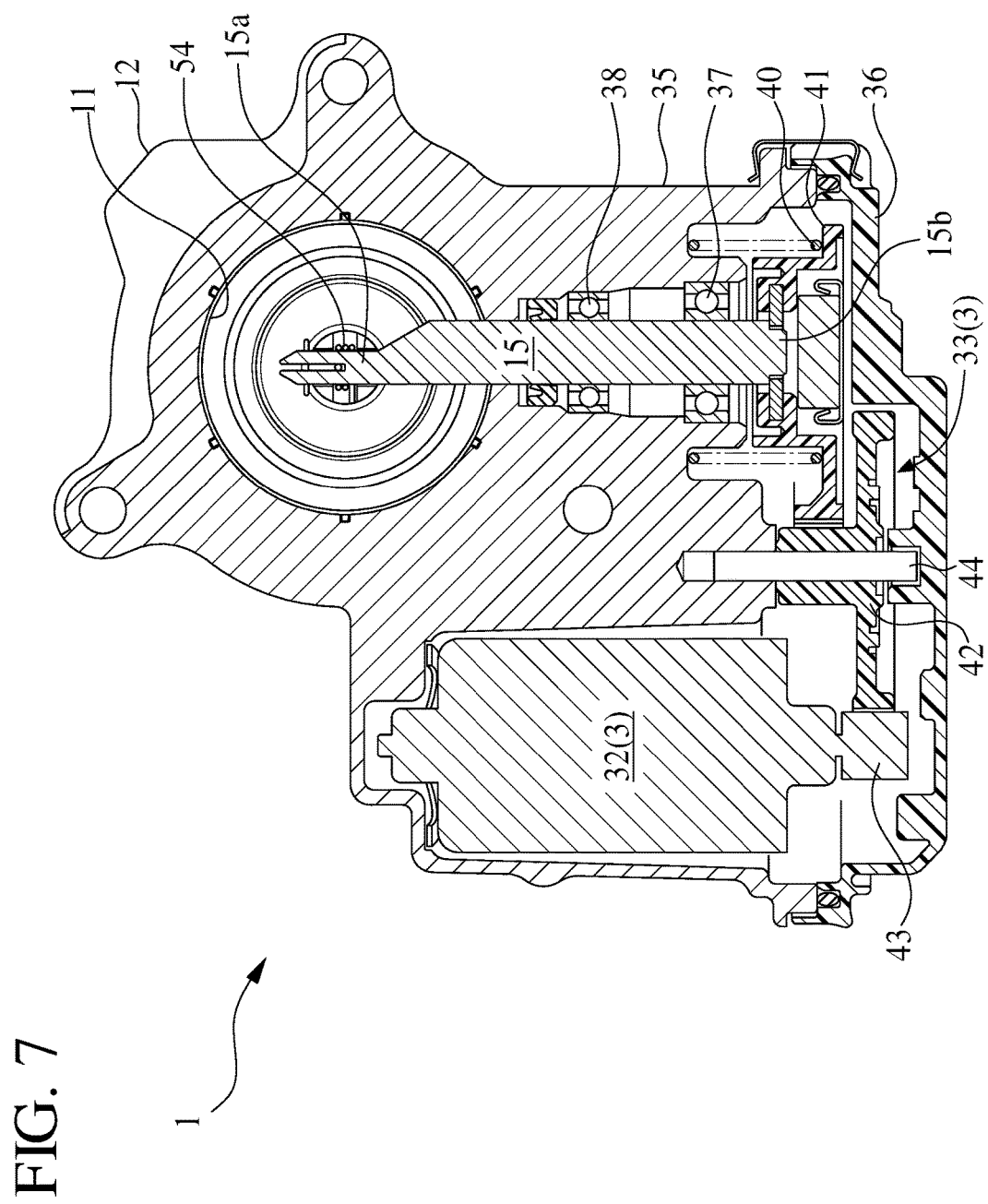
FIG. 7 is a cross-sectional view taken along a line B-B in FIG. 1.
Figure 8:
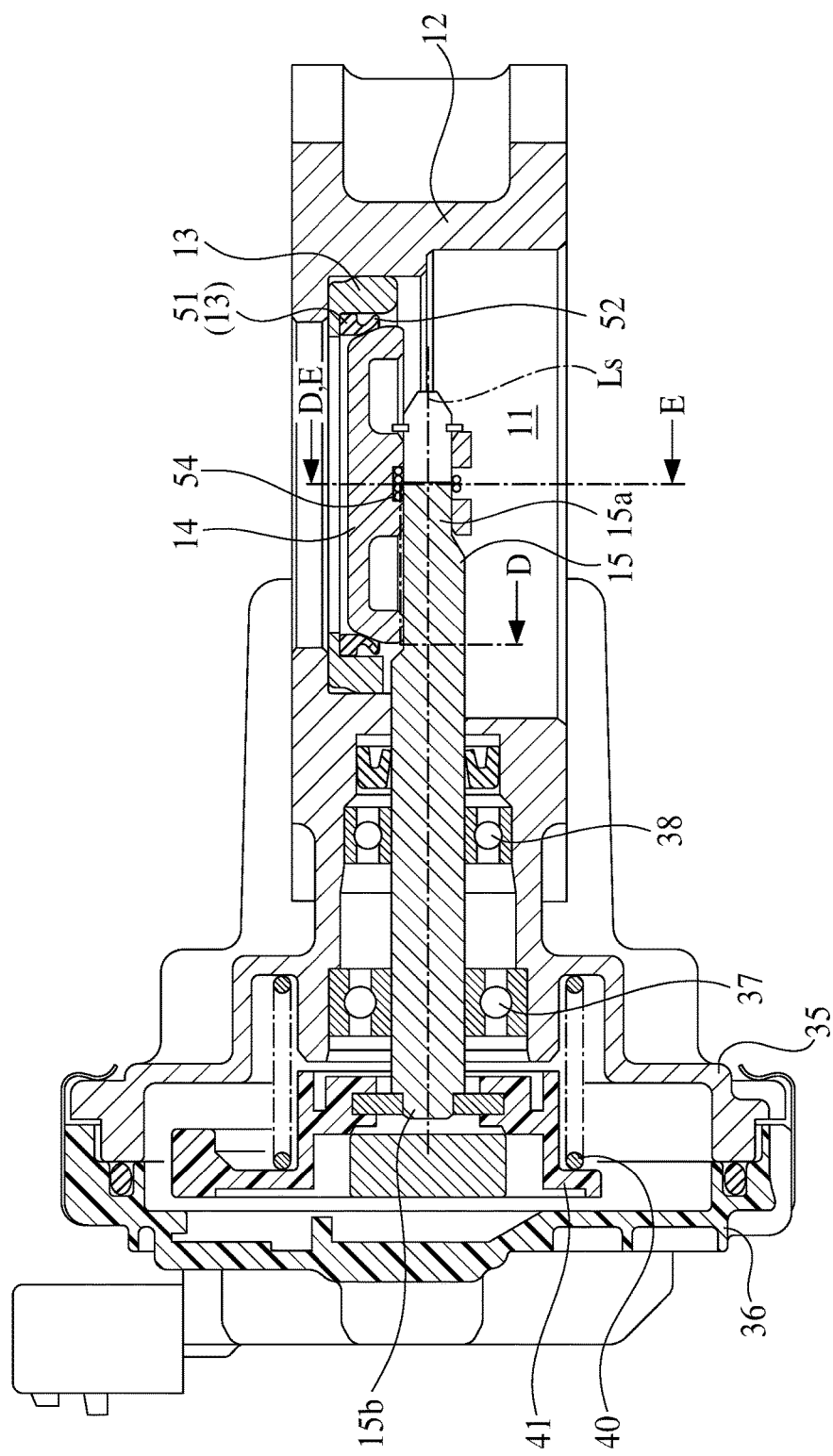
FIG. 8 is a cross-sectional view taken along a line C-C in FIG. 1.

As shown in FIGS. 7 and 8, a valve housing 35 made of metal or synthetic resin is provided with the flow passage 11 and the pipe part 12. An end frame 36 made of metal or synthetic resin closes an open end of the valve housing 35. The valve element 14 and the rotary shaft 15 are provided in the valve housing 35. The rotary shaft 15 includes a pin 15a at a distal end thereof. Specifically, the pin 15a is provided at one end of the rotary shaft 15 (on a side close to the valve element 14) in a direction of the shaft axis Ls. A diameter of the pin 15a is shorter than a diameter of a part of the rotary shaft 15 other than the pin 15a. At the other end of the rotary shaft 15 (on a side close to the main gear 41) in the direction of the shaft axis Ls, there is provided a proximal end portion 15b.

The rotary shaft 15 has a free end on a distal end side provided with the pin 15a, so that the distal end is inserted and placed in the flow passage 11 of the pipe part 12. The rotary shaft 15 is supported by a cantilever structure with a first bearing 37 and a second bearing 38 and in rotatable manner with respect to the valve housing 35 through the first bearing 37 and the second bearing 38. The first bearing 37 and the second bearing 38 are each constituted of a ball bearing. The first bearing 37 and the second bearing 38 are placed in respective positions between the valve element 14 and the main gear 41 along the shaft axis Ls to rotatably support the rotary shaft 15. The first bearing 37 is positioned closer to the main gear 41 than the second bearing 38. The valve element 14 is fixed to the pin 15a formed at the distal end of the rotary shaft 15 and is placed in the flow passage 11.

As shown in FIGS. 7 and 8, to the proximal end portion 15b of the rotary shaft 15, the main gear 41 is fixed. There is provided a return spring 40 between the valve housing 35 and the main gear 41 to generate a return spring force. The return spring force is a force to rotate the rotary shaft 15 in a valve closing direction and also a force to urge the valve element 14 in the valve closing direction. Further, the main gear 41 is provided integrally with the rotary shaft 15 to receive the drive force generated in the motor 32.

The motor 32 generates a drive force to rotate the rotary shaft 15 about the shaft axis Ls. As shown in FIG. 7, the motor 32 is drivingly coupled to the rotary shaft 15 through the speed reducing mechanism 33 to transmit the drive force to the rotary shaft 15. Specifically, a motor gear 43 is fixed to the motor 32. This motor gear 43 is drivingly coupled to the main gear 41 through an intermediate gear 42 to transmit the drive force.

The intermediate gear 42 is rotatably supported by the valve housing 35 through a pin shaft 44. The intermediate gear 42 is drivingly engaged with the main gear 41 and the motor gear 43. Each of the main gear 41, the intermediate gear 42, and the motor gear 43 constituting the speed reducing mechanism 33 is made of resin.

In the flow control valve 1 configured as above, when the drive force from the motor 32 is transmitted to the rotary shaft 15 through the speed reducing mechanism 33, the rotary shaft 15 rotates about the shaft axis Ls. This configuration brings the flow control valve 1 in the fully-closed state in which the sealing surface 18 of the valve element 14 comes to contact with the seat surface 17 of the valve seat 13 (see FIG. 3) or in the open state (the fully open state) in which the sealing surface 18 of the valve element 14 is positioned furthest from the seat surface 17 (see FIG. 4).

The flow control valve 1 of the present embodiment includes a lip seal 51 as shown in FIG. 6 and others. The lip seal 51 constitutes a part of the valve seat 13 and includes a lip portion 52 formed with the seat surface 17. As it will be explained later, this lip portion 52 is pressed and bent by the valve element 14 when the valve element 14 moves to the valve seat 13. The lip seal 51 corresponds to one example of "a valve-element moving direction restriction member" of the present invention.

Figure 9:
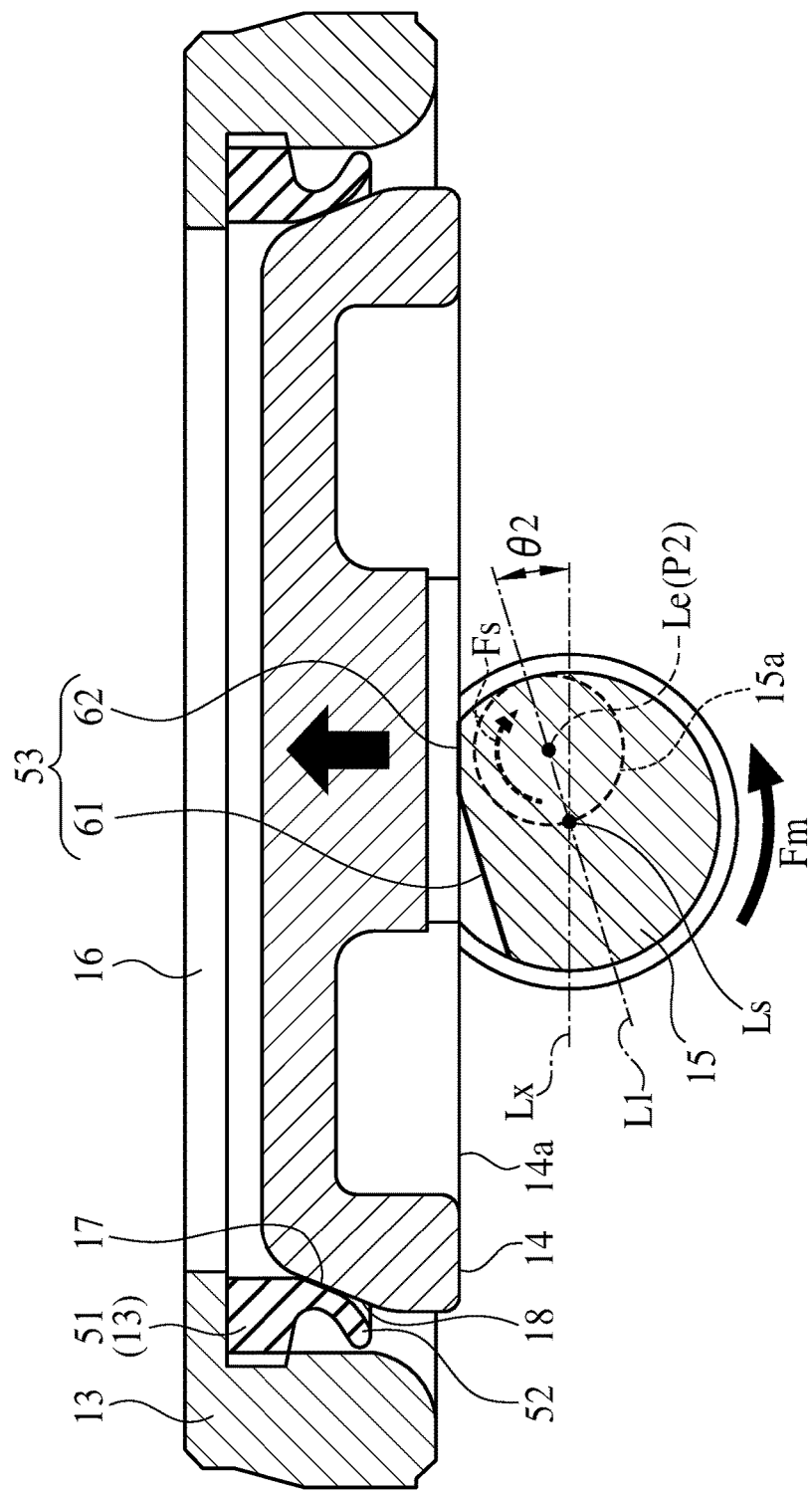
FIG. 9 is a cross-sectional view taken along a line D-D in FIG. 8.

The valve element 14 is allowed to relatively rotate with respect to the rotary shaft 15 about an eccentric axis Le (see FIG. 6 and others) as the central axis of the pin 15a provided eccentrically from the shaft axis Ls. The rotary shaft 15 is, as shown in FIG. 9, provided with a stopper 53 which is a protrusion formed integrally with the rotary shaft 15 and protruding toward the pin 15a from a columnar shape portion of the rotary shaft 15 which is supported by the first bearing 37 and the second bearing 38. The stopper 53 has a first face 61 and a second face 62 formed to face the valve element 14. The stopper 53 defines an allowable range of relative rotation of the valve element 14 about the eccentric axis Le with respect to the rotary shaft 15. To be specific, when the valve element 14 comes to contact with the first face 61 or the second face 62 of the stopper 53, the valve element 14 is restricted its further rotation about the eccentric axis Le with respect to the rotary shaft 15. In other words, the valve element 14 is allowed to relatively rotate about the eccentric axis Le with respect to the rotary shaft 15 within a range between a position where the valve element 14 is in contact with the first face 61 of the stopper 53 and a position where the valve element 14 is in contact with the second face 62 of the stopper 53. FIG. 9 shows a state in which the valve element 14 is in contact with the second face 62 of the stopper 53.

As shown in FIGS. 5 and 6, the flow control valve 1 includes a spring 54 as a coil spring made of wire wound helically into a coil-like shape. The spring 54 is provided between the valve element 14 and the rotary shaft 15. Specifically, one end portion of the wire constituting the spring 54 is connected to the valve element 14 and the other end portion of the wire constituting the spring 54 is connected to the rotary shaft 15. The spring 54 urges the valve element 14 toward the stopper 53.

In the flow control valve 1 having the above configuration of the present embodiment, operation of the valve while the valve is shifted from the open state to the fully-closed state is explained.

Figure 10:
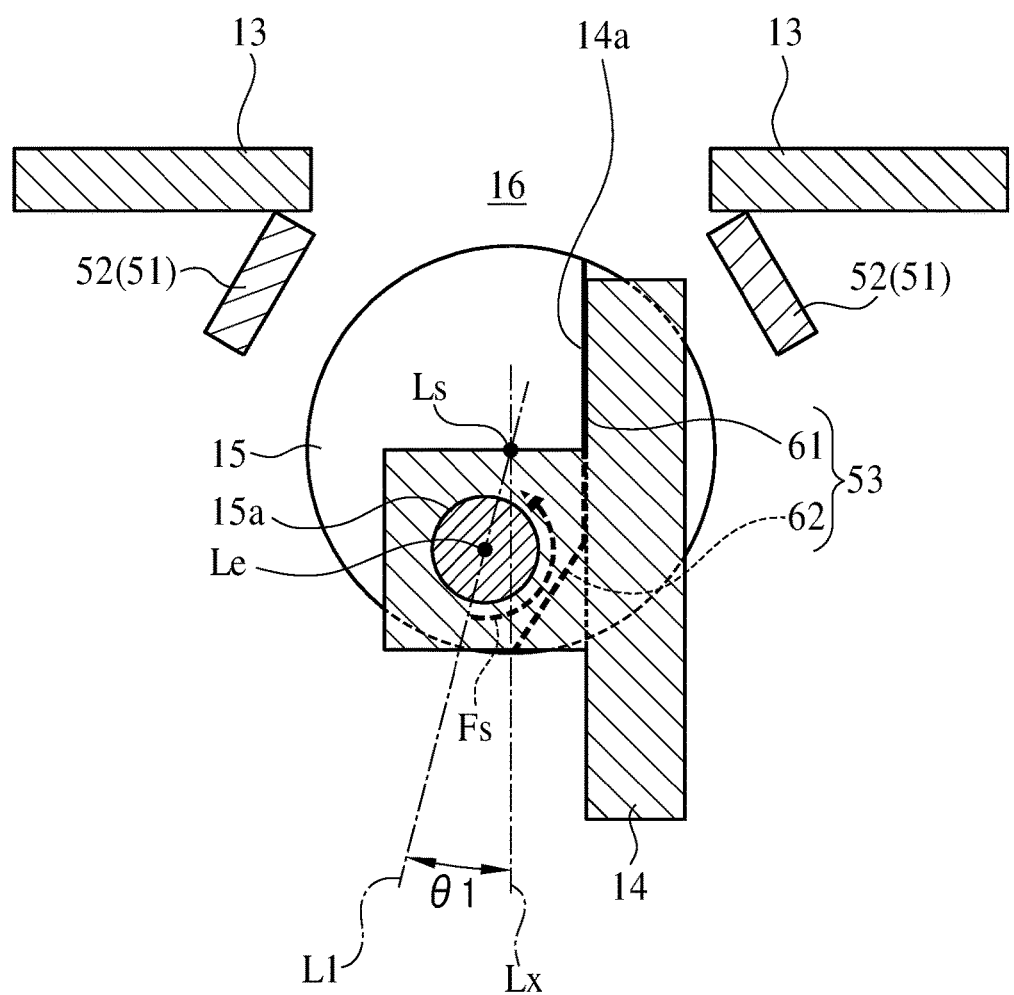
FIG. 10 is a schematic view showing the open state in a cross-sectional position taken along a line E-E in FIG. 8.

In the open state, the valve element 14 is urged by an urging force Fs of the spring 54 toward a direction of the first face 61 of the stopper 53 of the rotary shaft 15 as shown in FIG. 10. Thus, an end face 14a of the valve element 14 is in contact with the first face 61 of the stopper 53. As shown in FIG. 10, the end face 14a of the valve element 14 is an end face of a disc-like part of the valve element 14 facing the pin 15a of the rotary shaft 15.

Figure 11:
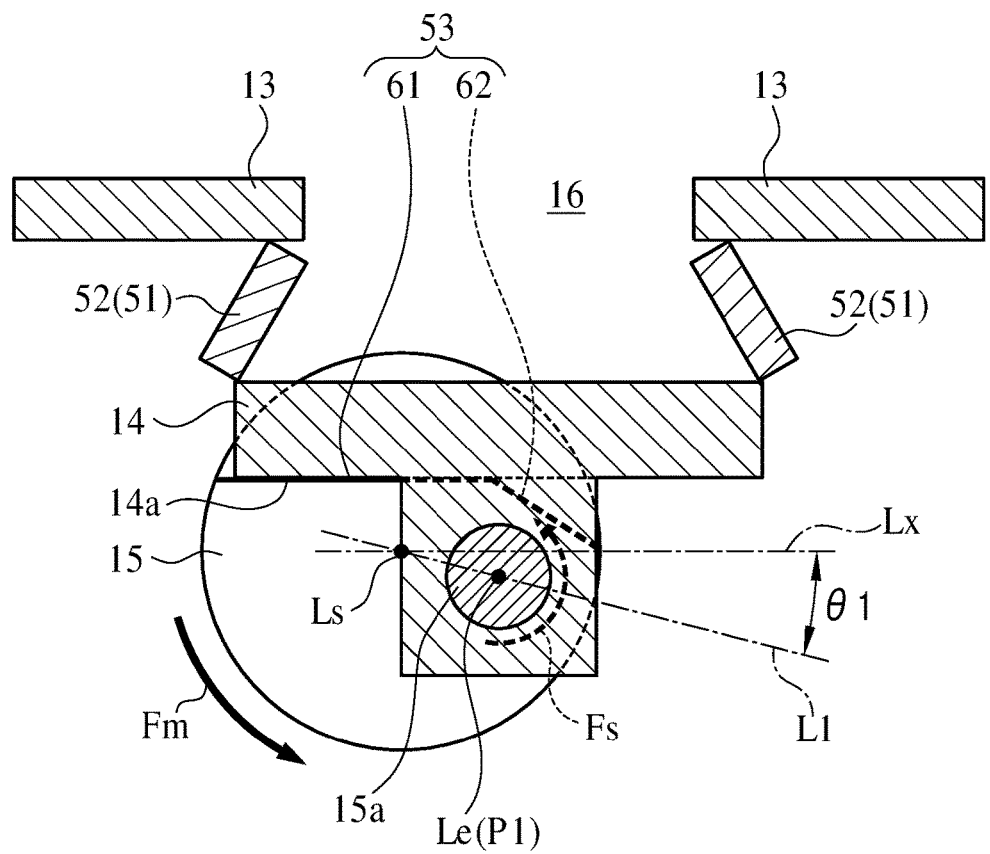
FIG. 11 is a schematic view showing a seated state in the cross-sectional position taken along a line E-E in FIG. 8.

When the rotary shaft 15 rotates about the shaft axis Ls by a drive force Fm of the motor 32, the valve element 14 integrally rotates with the rotary shaft 15 about the shaft axis Ls. The valve element 14 is thereafter brought into contact with the lip portion 52 of the lip seal 51 as shown in FIG. 11. The valve element 14 is accordingly restricted its integral rotation with the rotary shaft 15 about the shaft axis Ls. The lip seal 51 thus halts rotation of the valve element 14, which has integrally rotated with the rotary shaft 15 about the shaft axis Ls, when the valve element 14 comes to contact with the lip portion 52. The flow control valve 1 is in the seated state at this time, and this state corresponds to "a rotation halt time" of the present invention.

At this rotation halt time, the end face 14a of the valve element is in contact with the first face 61 of the stopper 53 of the rotary shaft 15, and the eccentric axis Le is in a first position P1 on a side apart from the valve seat 13 relative to a horizontal line Lx which extends through the shaft axis Ls and in parallel to a radial direction of the valve element 14 (a side opposite to the valve seat 13). Further, a line L1 connecting the shaft axis Ls and the eccentric axis Le is inclined by an angle θ1 to the horizontal line Lx.

Figure 12:
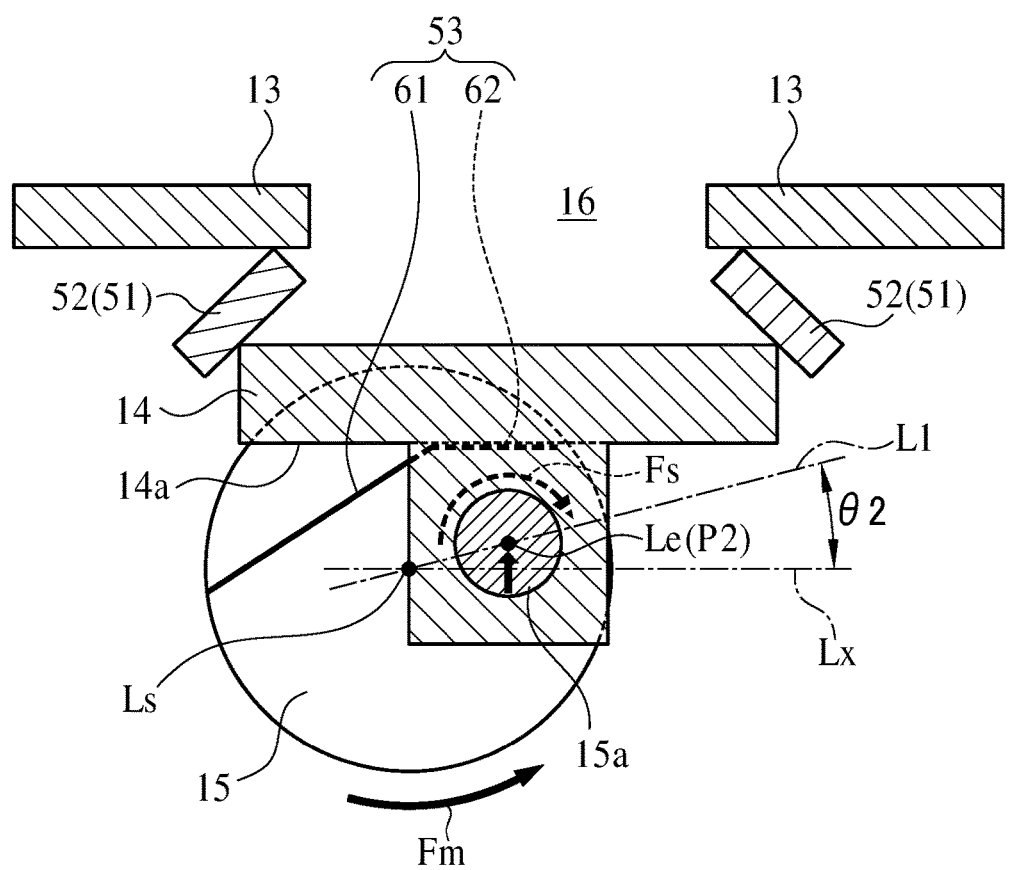
FIG. 12 is a schematic view showing the fully-closed state in the cross-sectional position taken along a line E-E in FIG. 8.

When the rotary shaft 15 further rotates about the shaft axis Ls by the drive force Fm from the motor 32, the valve element 14 does not rotate integrally with the rotary shaft 15 about the shaft axis Ls but moves to the valve seat 13 as shown in FIG. 12. This movement makes the end face 14a of the valve element 14 come to contact with the second face 62 of the stopper 53 of the rotary shaft 15. Specifically, the lip seal 51 restricts the valve element 14 from integrally rotating with the rotary shaft 15 about the shaft axis Ls, so that the valve element 14 instead relatively rotates about the eccentric axis Le with respect to the rotary shaft 15 rotating about the shaft axis Ls. Rotation of the rotary shaft 15 about the shaft axis Ls leads to movement of the eccentric axis Le toward the valve seat 13. This movement brings the valve element 14 to move to the valve seat 13, and thus the end face 14a of the valve element 14 comes to contact with the second face 62 of the stopper 53. The flow control valve 1 is under the fully-closed state at this time, and this state corresponds to "a stopper contact time" of the present invention.

The lip seal 51 thus halts rotation of the valve element 14 which has rotated integrally with the rotary shaft 15 about the shaft axis Ls. Subsequently, the valve element 14 relatively rotates about the eccentric axis Le with respect to the rotary shaft 15 which rotates about the shaft axis Ls, so that the valve element 14 moves to the valve seat 13.

During the above operation, a resilient force of the lip portion 52 generated when the lip portion 52 is pressed and bent by the valve element 14 is larger than the urging force Fs of the spring 54 urging the valve element 14 toward the stopper 53. Accordingly, the valve element 14 moves toward the valve seat 13 with maintaining its posture at the time when the valve element 14 is brought into contact with the lip seal 51. The urging force Fs at that time is applied in a direction opposite to a direction indicated in FIGS. 10 and 11.

Further, the eccentric axis Le is placed in a second position P2 on a side facing the valve seat 13 with respect to the horizontal line Lx as shown in FIG. 12. The line L1 connecting the shaft axis Ls and the eccentric axis Le is inclined by an angle θ2 to the horizontal line Lx. The angle θ1 is preferably equal to the angle θ2.

Figure 13:
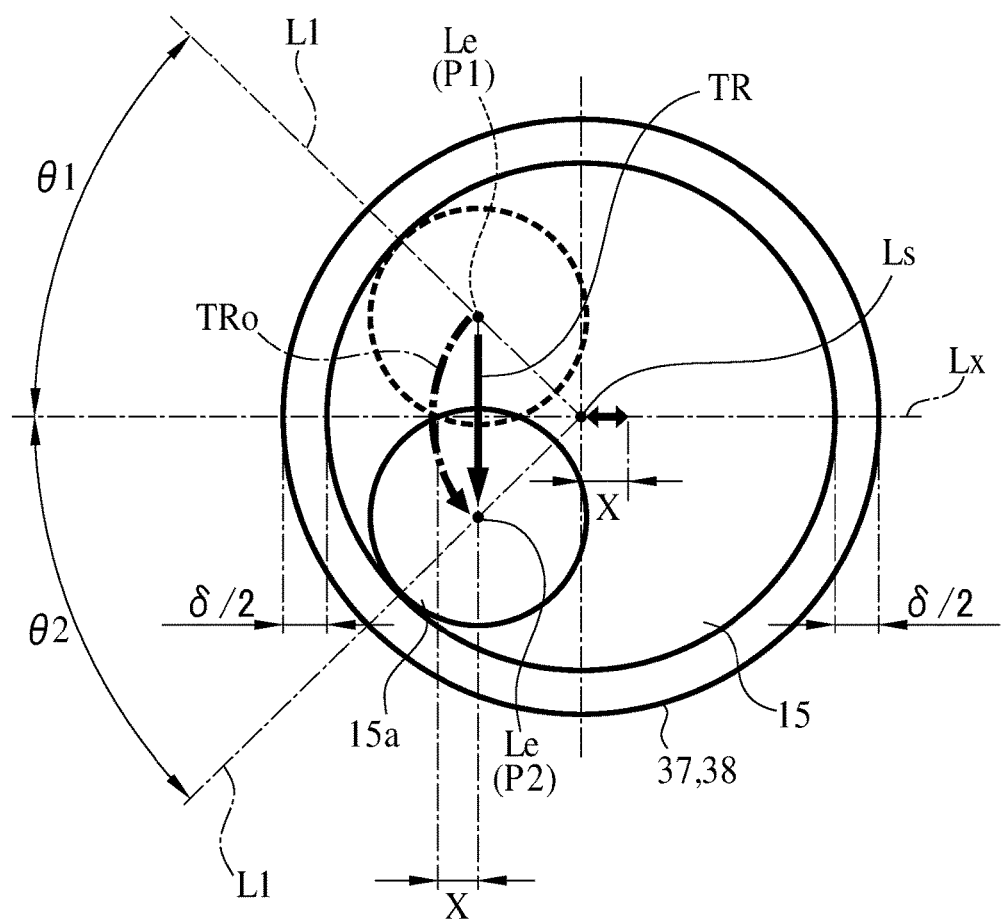
FIG. 13 is an explanatory view showing a position of an eccentric axis in the seated state and the fully-closed state.

As shown in FIG. 13, a theoretical track TRo of the eccentric axis Le is conceived to be a circular arc shape during a term from the seated state (a state shown in FIG. 11) in which the valve element 14 is in contact with the lip portion 52 of the lip seal 51 to the fully-closed state (a state shown in FIG. 12) of the flow control valve 1. This specifically means that the valve element 14 conceivably moves relative to the lip seal 51 and slides with the lip seal 51 by a moving amount X in a direction of the horizontal line Lx in FIG. 13. Actually, however, occurrence of a frictional force between the valve element 14 and the rotary shaft 15 restrains sliding of the valve element 14 with the rotary shaft 15.

In the present embodiment, a backlash amount δ (see FIG. 13) of the first bearing 37 and the second bearing 38, which is defined as a relatively movable amount of the rotary shaft 15 moving in the radial direction of the rotary shaft 15 with respect to the first bearing 37 and the second bearing 38, is arranged to be larger than the moving amount X. This leads to restriction of sliding of the valve element 14 and the lip seal 51 and also leads to reciprocal movement of the rotary shaft 15 in the radial direction by the moving amount X in the present embodiment. Accordingly, an actual track TR of the eccentric axis Le when the eccentric axis Le moves from the first position P1 to the second position P2 is depicted not circularly but linearly as indicated in FIG. 13. The valve element 14 and the lip seal 51 are thus restrained from sliding. In FIG. 13, a distance between the first position P1 and the second position P2 corresponds to a pressing amount of the valve element 14 pressing the valve seat 13 (specifically, the lip seal 51).

The flow control valve 1 of the present embodiment includes two bearings of the first bearing 37 and the second bearing 38, but alternatively, there may be provided one bearing instead of the first bearing 37 and the second bearing 38 or may be provided three or more bearings.

The flow control valve 1 of the present embodiment as explained above includes the lip seal 51. This lip seal 51 is configured to stop rotation of the valve element 14 which has been rotating integrally with the rotary shaft 15 about the shaft axis Ls and to make the valve element 14 relatively rotate about the eccentric axis Le with respect to the rotary shaft 15 which has rotated about the shaft axis Ls. Accordingly, the valve element 14 moves toward the valve seat 13.

As mentioned above, in the process from the open state to the fully-closed state, the valve element 14 stops rotating and then moves to the valve seat 13. This achieves restraint of abrasion between the valve seat 13 (specifically, the lip seal 51) and the valve element 14 caused by rotation movement of the valve element 14 on the valve seat 13 and its vicinity. Further, the valve element 14 can be firmly pressed against the valve seat 13, thus improving the sealing performance between the valve seat 13 and the valve element 14. Therefore, the flow passage 11 is securely sealed in the fully-closed state.

In the present embodiment, the flow control valve 1 is provided with the stopper 53 to define an allowable range of the valve element 14 to relatively rotate about the eccentric axis Le with respect to the rotary shaft 15 and the spring 54 provided between the valve element 14 and the rotary shaft 15 to urge the valve element 14 toward the stopper 53. The lip seal 51 is formed with the lip portion 52 which will be pressed and bent by the valve element 14 while the valve element 14 is moving to the valve seat 13. The resilient force of the lip portion 52 generated when the lip portion 52 is bent is larger than the urging force Fs of the spring 54 urging the valve element 14 toward the stopper 53. Thus, the valve element 14 moves to the valve seat 13 with maintaining its posture at the time when the valve element 14 comes to contact with the lip seal 51. As a result, the sealing performance between the valve seat 13 and the valve element 14 is enhanced.

In the present embodiment, at the rotation halt time when the lip seal 51 halts rotation of the valve element 14, namely, in the seated state, the eccentric axis Le is located in the first position P1 on a side opposite to the valve seat 13 with respect to the horizontal line Lx. At the stopper contact time after the rotation halt time when the lip seal 51 brings the valve element 14 toward the valve seat 13 and the valve element 14 comes to contact with the second face 62 of the stopper 53, namely, in the fully-closed state, the eccentric axis Le is located in the second position P2 on a side close to the valve seat 13 with respect to the horizontal line Lx. The valve element 14 thus further moves to the valve seat 13 after coming to contact with the lip seal 51. This achieves improvement in the sealing performance between the valve seat 13 and the valve element 14.

In the present embodiment, the backlash amount δ of the first bearing 37 and the second bearing 38 is larger than the moving amount of the rotary shaft 15 moving in the radial direction while the eccentric axis Le moves from the first position P1 to the second position P2. This achieves movement of the rotary shaft 15 in the radial direction with no restriction by the first bearing 37 and the second bearing 38 when the flow control valve 1 is shifted from the seated state to the fully-closed state. Accordingly, movement of the valve element 14 caused by movement of the rotary shaft 15 is prevented, thus restraining sliding of the valve element 14 with the lip seal 51.

Further, in the present embodiment, the stopper 53 is a protrusion integrally formed with the rotary shaft 15. This integral structure reduces the number of components, achieving cost reduction.

An application example of the flow control valve 1 of the present embodiment is explained. The flow control valve 1 of the present embodiment is adopted to an integration valve 181 of an air system 113 in a fuel cell system 101 which will be explained below, for example. The fuel cell system 101 is now explained.

Figure 14:
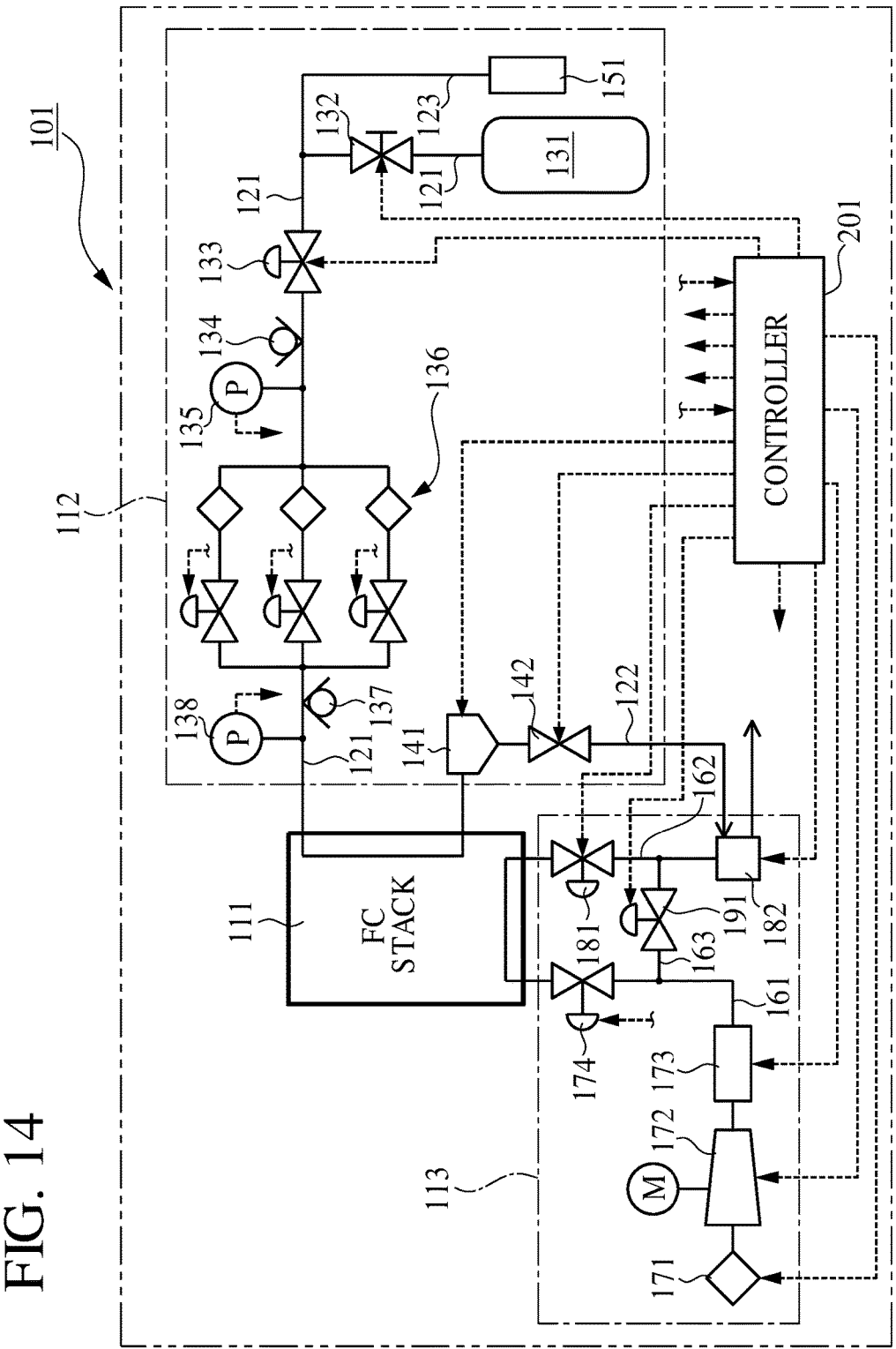
FIG. 14 is a schematic configurational view of a fuel cell system.

The fuel cell system 101 is mounted in an electric automobile and used for supplying electric power to a drive motor (not shown) for the electric automobile. The fuel cell system 101 includes a fuel cell (an FC stack) 11, a hydrogen system 112, and the air system 113 as shown in FIG. 14.

The fuel cell 111 generates electricity upon receipt of supply of fuel gas and supply of oxidant gas. In the present embodiment, the fuel gas is hydrogen gas and the oxidant gas is air. Specifically, the fuel cell 111 is configured to produce electric power upon receipt of hydrogen gas supplied from the hydrogen system 112 and air supplied from the air system 113. The electric power generated in the fuel cell 111 will be supplied to a drive motor (no shown) through an inverter (not shown).

The hydrogen system 112 is provided on an anode side of the fuel cell 111. This hydrogen system 112 is provided with a hydrogen supply passage 121, a hydrogen exhaust passage 122, and a filling passage 123. The hydrogen supply passage 121 is a flow passage to supply hydrogen gas from a hydrogen tank 131 to the fuel cell 111. The hydrogen exhaust passage 122 is a flow passage to exhaust hydrogen gas to be discharged out of the fuel cell 111 (hereinafter, appropriately referred to as "hydrogen offgas"). The filling passage 123 is a flow passage to fill hydrogen gas into the hydrogen tank 131 through a fill port 151.

The hydrogen system 112 includes, on the hydrogen supply passage 121, a main stop valve 132, a high-pressure regulator 133, a medium-pressure relief valve 134, a pressure sensor 135, an injector part 136, a low-pressure relief valve 137, and a pressure sensor 138, which are arranged from a side close to the hydrogen tank 131. The main stop valve 132 is a valve for switching supply and shutoff of hydrogen gas from the hydrogen tank 131 to the hydrogen supply passage 121. The high-pressure regulator 133 is a pressure regulating valve to reduce the pressure of hydrogen gas. The medium-pressure relief valve 134 is a valve configured to open when the pressure in the hydrogen supply passage 121 between the high-pressure regulator 133 and the injector part 136 becomes a predetermined pressure or higher in order to regulate the pressure to below the predetermined pressure. The pressure sensor 135 is a sensor to detect the pressure in the hydrogen supply passage 121 between the high-pressure regulator 133 and the injector part 136. The injector part 136 is a mechanism for regulating a flow rate of hydrogen gas. The low-pressure relief valve 137 is a valve configured to open when the pressure in the hydrogen supply passage 121 between the injector part 136 and the fuel cell 111 becomes a predetermined pressure or higher in order to regulate the pressure to below the predetermined pressure. The pressure sensor 138 is a sensor to detect the pressure in the hydrogen supply passage 121 between the injector part 136 and the fuel cell 111.

The hydrogen system 112 further includes, on the hydrogen exhaust passage 122, a gas-liquid separator 141 and an exhaust-drain valve 142 arranged in this order from a side close to the fuel cell 111. The gas-liquid separator 141 is a device to separate moisture from the hydrogen offgas. The exhaust-drain valve 142 is a valve to switch exhaust and shutoff of hydrogen gas and moisture from the gas-liquid separator 141 to a diluter 182 of the air system 113.

The air system 113 is provided on a cathode side of the fuel cell 111. This air system 113 is provided with an air supply passage 161, an air exhaust passage 162, and a bypass passage 163. The air supply passage 161 is a flow passage to supply air from the outside of the fuel cell system 101 into the fuel cell 111. The air exhaust passage 162 is a flow passage to exhaust air discharged out of the fuel cell 111 (hereinafter, appropriately referred to as "air offgas"). The bypass passage 163 is a flow passage to allow air to flow from the air supply passage 161 to the air exhaust passage 162 without passing through the fuel cell 111.

The air system 113 further includes, on the air supply passage 161, an air pump 172, an intercooler 173, and a sealing valve 174, which are arranged in this order from a side of an air cleaner 171. The air cleaner 171 is a device to clean up air externally taken in the fuel cell system 101. The air pump 172 is a device to adjust a flow rate of air. The intercooler 173 is a device to cool air. The sealing valve 174 is a valve to switch supply and shutoff of air flowing to the fuel cell 111.

The air system 113 further includes, on the air exhaust passage 162, an integration valve 181 and a diluter 182 arranged in this order from a side close to the fuel cell 111.

The integration valve 181 is a valve to switch exhaust and shutoff of air offgas from the fuel cell 111 (a valve having a air sealing function) and also a valve to regulate exhaust amount of air offgas from the fuel cell 111 (a valve having a flow rate regulation function). In the present embodiment, the above-explained flow rate control valve 1 is adopted for the integration valve 181. In FIGS. 3 and 4, the flow passage 11 on a side opposite to the valve element 14 and the rotary shaft 15 with respect to the valve seat 13 is located close to the fuel cell 111, and the flow passage 11 on a side close to the valve element 14 and the rotary shaft 15 with respect to the valve seat 13 is located close to the diluter 182. To be specific, air flows through the integration valve 181 in the flow passage 11 from a side of the valve seat 13 to the valve element 14 (the rotary shaft 15).

The diluter 182 is a device to dilute hydrogen offgas exhausted from the hydrogen exhaust passage 122 by the air offgas and the air flowing through the bypass passage 163.

The air system 113 further includes a bypass valve 191 on the bypass passage 163. The bypass valve 191 is a valve to control a flow rate of air in the bypass passage 163.

The fuel cell system 101 is further provided with a controller 201 to control the system. Specifically, the controller 201 is configured to control each part or device of the fuel cell system 101. In addition, the fuel cell system 101 also includes a cooling system (not shown) to cool the fuel cell 111.

In the fuel cell system 101 configured as above, the hydrogen gas supplied from the hydrogen supply passage 121 to the fuel cell 111 is consumed in the fuel cell 111 to generate electric power and thereafter is exhausted as hydrogen offgas from the fuel cell 111 to the outside of the fuel cell system 101 through the hydrogen exhaust passage 122 and the diluter 182. The air supplied from the air supply passage 161 to the fuel cell 111 is consumed in the fuel cell 111 to generate electric power and then is exhausted as air offgas from the fuel cell 111 to the outside of the fuel cell system 101 through the air exhaust passage 162 and the diluter 182.

In the above-explained fuel cell system 101, application of the flow control valve 1 of the present embodiment to the integration valve 181 in the air system 113 can achieve restraint of abrasion between the valve seat 13 and the valve element 14 caused by rotation movement of the valve element 14 on the valve seat 13 and its vicinity. The integration valve 181 can thus have secure sealing performance in the fully-closed state. This results in improved hermetical sealing of the fuel cell 111 in the fully-closed state of the integration valve 181 when generation of electricity in the fuel cell 111 is suspended. Accordingly, less reaction occurs in the fuel cell 111 and thus the fuel cell 111 is prevented from degradation due to oxidization in the fuel cell 111.

The flow control valve 1 of the present embodiment can be adopted for the sealing valve 174 and the bypass valve 191 of the air system 113 in the fuel cell system 101.

Figure 15:
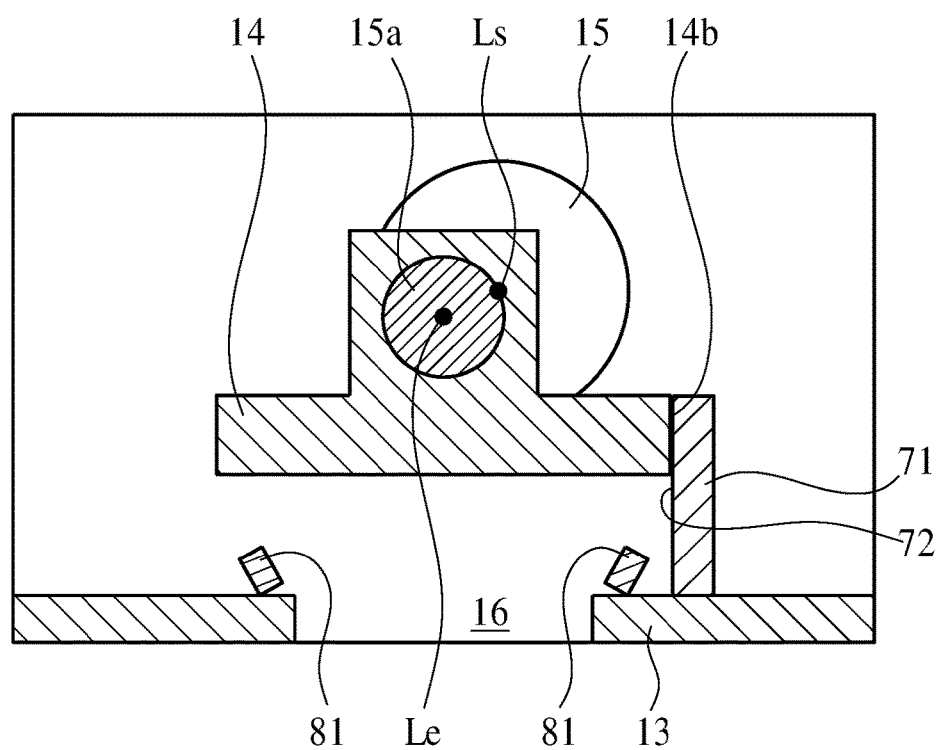
FIG. 15 is a schematic view of a flow control valve in a modified example.

As one modified example, the flow control valve 1 may be provided with a protrusion part 71 protruding toward the valve element 14 from the valve seat 13 as shown in FIG. 15. The protrusion part 71 has a side face 72 (a guide portion). The side face 72 comes to contact with a distal end 14b extending in a rotation direction of the valve element 14 when the valve element 14 having been rotating integrally with the rotary shaft 15 about the shaft axis Ls stops rotating. The side face 72 then guides the valve element 14 in its movement to the valve seat 13 while the valve element 14 relatively rotates about the eccentric axis Le with respect to the rotary shaft 15 and moves to the valve seat 13. The protrusion part 71 corresponds to one example of the "valve-element moving direction restriction member" of the present invention. The valve seat 13 is provided with a seal member 81 to secure sealing performance of the valve element 14 in the fully-closed state. The flow control valve 1 of the modified example is thus configured such that the side face 72 of the protrusion part 71 guides movement of the valve element 14, thereby restraining abrasion between the valve seat 13 (sealing member 81) and the valve element 14 caused by rotation movement of the valve element 14 on the valve seat 13 and its vicinity.

The above-explained embodiment is only illustration and the present invention is not limited to the above embodiment. The present invention may be applied with various changes and improvements without departing from the scope of its subject matter.

REFERENCE SIGNS LIST

1 Flow control valve
13 Valve seat
14 Valve element
15 Rotary shaft
15a Pin
16 Valve hole
17 Seat surface
18 Sealing surface
32 Motor
37 First bearing
38 Second bearing
51 Lip seal
52 Lip part
53 Stopper
54 Spring
61 First face
62 Second face
71 Protrusion part
72 Side face
101 Fuel cell system
111 Fuel cell
112 Hydrogen system
113 Air system
162 Air exhaust passage
174 Sealing valve
181 Integration valve
191 Bypass valve
Ls Shaft axis
Lh Central axis (of the valve hole)
Lv Central axis (of the valve element)
Le Eccentric axis
L1 Line (connecting the shaft axis and the eccentric axis)
Lx Horizontal line
Fs Urging force
Fm Drive force of the motor
P1 First position
P2 Second position
θ1 Angle
θ2 Angle
X Moving amount
δ Backlash

The invention claimed is:

1. A flow control valve comprising:
a valve seat including a valve hole and a seat surface formed at an edge of the valve hole;
a valve element formed with a sealing surface on an outer periphery corresponding to the seat surface; and
a rotary shaft integrally provided with the valve element, the rotary shaft having a central axis being positioned eccentrically from a central axis of the valve hole in a radial direction of the valve hole, and the sealing surface being positioned eccentrically from the central axis of the rotary shaft toward an extending direction of a central axis of the valve element,
wherein the flow control valve further comprises a valve-element moving direction restriction member configured to halt rotation of the valve element integrally rotatable with the rotary shaft about the central axis of the rotary shaft and thereafter relatively rotate the valve element about an eccentric axis positioned eccentrically from the central axis of the rotary shaft with respect to the rotary shaft rotatable about the central axis of the rotary shaft so that the valve element moves to the valve seat and;
a stopper for defining a range of relative rotation of the valve element configured to rotate about the eccentric axis with respect to the rotary shaft; and a spring provided between the rotary shaft and the valve element to urge the valve element toward the stopper, wherein the valve-element moving direction restriction member constitutes a part of the valve seat and includes a lip portion configured to be pressed and bent by the valve element when the valve element moves to the valve seat, and a resilient force generated in the lip portion when the lip portion is bent is larger than an urging force of the spring urging the valve element toward the stopper.

2. The flow control valve according to claim 1,
at a rotation halt time when the valve-element moving direction restriction member stops rotation of the valve element, the eccentric axis is positioned in a first position which is a side opposite to the valve seat with respect to a horizontal line extending through the central axis of the rotary shaft and parallel to a radial direction of the valve element, and
at a stopper contact time after the rotation halt time when the valve-element moving direction restriction member brings the valve element to the vale seat to make the valve element come to contact with the stopper, the eccentric axis is positioned in a second position on a side close to the valve seat with respect to the horizontal line.

3. The flow control valve according to claim 2, wherein the flow control valve includes a bearing to support the rotary shaft, and
the rotary shaft has an allowable moving amount of relatively moving in the radial direction of the rotary shaft with respect to the bearing, the allowable moving amount being larger than a moving amount of the rotary shaft moving in the radial direction of the rotary shaft when the eccentric axis moves between the first position and the second position.

4. The flow control valve according to claim 1, wherein the stopper is a protrusion integrally formed with the rotary shaft.

5. The flow control valve according to claim 2, wherein the stopper is a protrusion integrally formed with the rotary shaft.

6. The flow control valve according to claim 3, wherein the stopper is a protrusion integrally formed with the rotary shaft.

* * * * *